United States Patent [19]

Kakuda et al.

[11] Patent Number: 4,802,162
[45] Date of Patent: Jan. 31, 1989

[54] AUTOMATIC PROTOCOL SYNTHESIZING SYSTEM

[75] Inventors: Yoshiaki Kakuda, Tokyo; Yasushi Wakahara, Yokohama; Masamitsu Norigoe, Niza, all of Japan

[73] Assignee: Kokusai Denshin Denwa Kabushiki Kaisha, Tokyo, Japan

[21] Appl. No.: 930,341

[22] Filed: Nov. 12, 1986

[30] Foreign Application Priority Data

Nov. 14, 1986 [JP] Japan ................................ 61-253640

[51] Int. Cl.$^4$ ....................... G01R 31/28; G06F 15/31
[52] U.S. Cl. ....................................... 371/15; 364/900
[58] Field of Search ....................... 371/15, 16, 20, 23; 364/200, 900, 578

[56] References Cited

PUBLICATIONS

Cork et al., Automated Use of a Theoretical System Description in Practical Testing, IBM Technical Discl. Bulletin, vol. 19, No. 4, Sep. 1976, pp. 1446–1447.
Hayes, Transition Count Testing of Combinational Logic Circuits, IEEE Trans. on Computers, vol. C-25, No. 6, Jun. 1976, pp. 613–620.

*Primary Examiner*—Charles Atkinson
*Attorney, Agent, or Firm*—Emmanuel J. Lobato; Robert E. Burns

[57] ABSTRACT

An automatic protocol synthesizing system in which, incomplete state transition diagrams of at least two functionally incomplete processes forming a protocol are received and completed state transition diagrams of the processes are outputted. In accordance with the present invention, there is provided a checking circuit for making a check for a logical error of the incomplete state transition diagram an embedding circuit embeds the state transition diagram of a process corresponding to the incomplete state transition diagram of an ith (where $1 \leq i \leq N$) one of the processes in the ith incomplete state transition diagram. A state transition diagram generating circuit is provided for automatically generating a state transition diagram including all of the remaining (i+1)th and subsequent processes, on the basis of the embedded state transition diagram; and a dividing circuit divides the thus automatically synthesized state transition diagram into the state transition diagram of the (i+1)th one of all the automatically generated processes and the state transition diagram for the other processes. The operations of the checking circuit, the embedding circuit, the state transition diagram generating circuit and the dividing circuit are repeated by (N−1) times to complete the state transition diagram for each process, thereby making the protocol functionally complete.

2 Claims, 8 Drawing Sheets

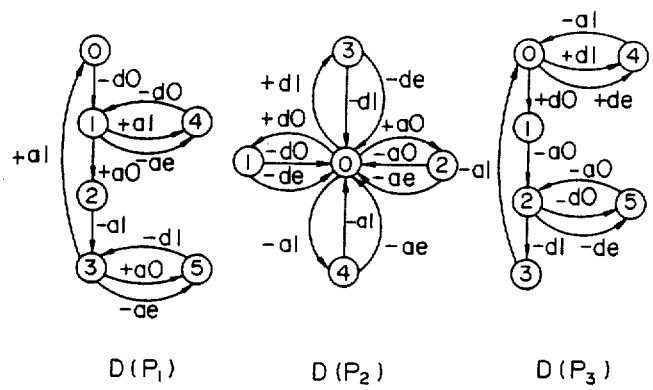
Fig.1A  Fig.1B  Fig.1C
D(P₁)  D(P₂)  D(P₃)
Fig. 2
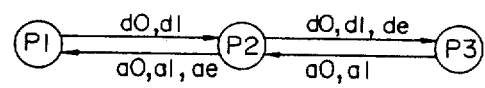

AUTOMATIC PROTOCOL SYNTHESIZING SYSTEM

BACKGROUND OF THE INVENTION

The present invention relates to an automatic protocol synthesizing system which inputs a protocol specification containing a functional deficiency and automatically fills up the deficiency to complete the protocol specification for output.

Automatic protocol synthesis is a technique for efficiently designing a logically consistent protocol specification. The automatic synthesizing process therefor starts with a step of inputting a functionally deficient but logically consistent protocol specification, followed by a step of automatically making up for the deficiency to output a protocol specification which is free from a logical error as a whole.

However, Prior art mentioned above has a defect such that an increase in the number of processes causes an exponential increase in the numbers of states and state transitions of the protocol being synthesized. Moreover, the prior art poses problems that a process containing a looping reception transition sequence cannot be synthesized and that a protocol cannot be automatically synthesized according to the number of processes to be synthesized.

Accordingly, there has been a strong demand for an automatic protocol synthesizing system with which it is possible to efficiently synthesize a desired number of processes, each containing a closed-circuit reception transition sequence, regardless of the number of the processes to be synthesized.

SUMMARY OF THE INVENTION

In view of the afore-mentioned defects of the prior art, an object of the present invention is to provide an automatic protocol synthesizing system which permits efficient automatic synthesization of a desired number of processes, each containing a looping transition sequence, without yielding any logical errors and without causing a substantial increase in the numbers of states and state transitions of the protocol to be synthesized in accordance with the number of processes involved.

The automatic protocol synthesizing system of the present invention comprises: at least means for making a check for a logical error of an incomplete state transition diagram; means whereby the state transition diagram of one of a plurality of processes, corresponding to an incomplete state transition diagram of an ith (where $1 \leq i \leq N$) process, is embedded or incorporated therein; means whereby a state transition diagram including the remaining (i+1)th and subsequent processes is automatically generated on the basis of the embedded or incorporated state transition diagram; and means for dividing the automatically generated state transition diagram into a state transition diagram of the (i+1)th process and a state transition diagram for the other processes. By repeating the operations of the above four means (N−1) times, the state transition of each process is made complete, thus automatically synthesizing a protocol. BRIEF DESCRIPTION OF THE DRAWINGS The present invention will be described in detail below in comparison with prior art with reference to the accompanying drawings, in which:

FIGS. 1A to 1C are state transition diagrams of an AB protocol heretofore employed;

FIG. 2 is a diagram showing the relationships of signal transmission and reception of the AB protocol, for explaining the present invention;

DETAILED DESCRIPTION

Figure 3A:
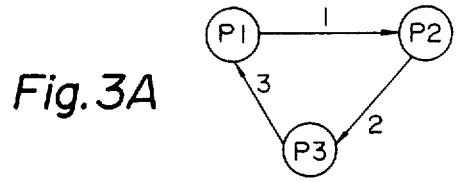
FIG. 3A is a diagram showing a predetermined relationship of signal transmission and reception between processes, for explaining the present invention.

To make differences between prior art and the present invention clear, an example of the prior art will first be described.

FIGS. 1A to 1C show diagrammatic representation of an AB protocol (Alternating Bit Protocol) now put to practical use. The AB protocol represents the protocol specification of a communication system, which is shown to comprise a process 1 of FIG. 1A (a process at the transmitting side), a process 2 of FIG. 1B (a network process), and a process 3 of FIG. 1C (a process at the receiving side). The communication system herein mentioned may be, for example, a system in which the processes correspond to physical elements such as a switchboard and terminal equipment, or logical elements in a CPU and a memory. That is to say, a processing unit which transmits and receives signals between it and other functional blocks is called a process.

In FIGS. 1A to 1C, circles indicate the states of the processes, arrows their state transitions, d0, d1, a0, a1, and ae signals to be transmitted and received (which signals will hereinafter be referred to as a "signal x"), and labels −x and +x on the arrows the transmission and reception of the signal x. The initial state of each process is a 0. The process 1 assumes the initial state 0, and when transmitting the signal d0 to the process 2, it makes the transition to a state 1, and when receiving the signal a0 in that state, it makes the transition to a state 2. The process 2 assumes the initial state 0, and when receiving the signal d0 from the process 1, it makes the transition to the state 1, and when transmitting the signal d0 to the process 3 in that state, it makes the transition to the state 0. The process 3 also make the state transitions similar to those mentioned above. Thus, the operations of each process can be designed relatively easily. However, it is not easy to design the protocol so that the processes 1, 2 and 3 are logically consistent with one another. Accordingly, there is a demand for a method of designing a protocol which is free from logical errors among a plurality of processes.

Conventional protocol synthesizing methods are classified into the following three categories:

(1) A method of interactively synthesizing a, protocol which comprises N ($\geq 2$) processes. This is a method which applies a protocol verification technique to a protocol specification having made up for its deficiency. However, this method is incapable of automatically synthesizing a protocol; in addition, when no logical error exists, the compensation for deficiencies can be further continued, but if a logical error is present, a portion or portions already compensated for must be corrected.

(2) A method of automatically synthesizing a protocol without using the protocol verification technique. However, this method is limited specifically to protocols which comprise two processes. In addition, a protocol containing a looping reception transition sequence yields a logical inconsistency and cannot be synthesized; the object of synthesis is limited.

(3) A method for automatically synthesizing a protocol which comprises N ($\geq 2$) has been proposed by the present inventor (Pat. appln. No. 41185/85). With this method, however, since the protocol is synthesized every two processes, the number of states of the protocol being synthesized and the number of its state transitions increase exponentially with an increase in the number of processes. The above example of prior art has the aforementioned defects.

The present invention for dissolving the above problems of prior art will be described.

The principles of the present invention will hereinafter be described in connection with the AB protocol. Now, terms for explaining the protocol specification will be defined.

A large-scale protocol is usually described for each block which is a set of a plurality of processes. Each block may sometimes be subdivided. Then, the protocol is defined in terms of hierarchy as follows:

A signal transmit-receive relation diagram of one block $B_{il-1}^{l-1}$ of a level $l-1$ (where $l \geq 1$) is represented by a directed graph $B_{il-1}^{l-1} = (B^l, C^l, L^l)$. In this instance, let a block $B^l = \{B_1^l, \ldots, B_{Nl}^l\}$, a channel $C^l \subseteq B^l \times B^l$, the channel $C^l = \{C_{11}^l, \ldots, C_{NlNl}^l\}$, and a label $L^l = \{L_{11}^l, \ldots, L_{NlNl}^l\}$. In the above, $N_l$ is the number of blocks of the level $l$ included in the block $B_{il-1}^{l-1}$, $B_i^l$ (where $i=1, \ldots, N_l$) is one block of the level included in the block $B_{il-1}^{l-1}$, $C_{il-1}^{l-1}$ is one channel from the block $B_i^l$ to $B_j^l$, and $L_{ij}^l$ is a set of signals which are transmitted and received over the channel $C_{ij}^l$. A block $B^0$ of a level 0 is called a protocol, which is described as R. The block $B_i^l = (\phi, \phi, \phi)$ of the level 1 is called a process, which is described as $P_i^l$. Now, let the number of all processes included in the protocol be represented by N. Incidentally, the hierarchy of the protocol R can be represented by a tree structure which is shown only in terms of the level of the block $B_i^l$ except the channel $C_{il}^l$ and the label $L_{il}^l$. FIG. 2 is the afore-mentioned directed graph which shows the AB protocol of FIG. 1.

In the description of the protocol the following assumptions are used.
(1) The time for a signal transmission between processes is a finite non-negative value.
(2) A state transition in each process is deterministic, and the time needed therefor is zero.
(3) The sequence of reception of signals which are transmitted and received between processes is the same as the sequence of transmission.

State changes of the block by signal transmission and reception are represented by a state transition diagram.

The state transition diagram of the block $B_{il}^l$ of the level 1 is represented by a finite state machine $D(B_{il}^l) = (S_{il}^l, T_{il}^l, M_{il}^l)$. In this case, let $S_{il}^l = \{S_1, \ldots, S_{ns}\}$, $T_{il}^l \subseteq S_{il}^l \times S_{il}^l$, $T_{il}^l = \{t_1, \ldots, t_{nt}\}$, $M_{il}^l = \{m_1, \ldots m_{nm}\}$, $n_m = n_t$. Here, $s_i \epsilon S_{il}$ represents the state of the block $B_i^l$, $t_i \epsilon T_{il}^l$ a state transition of the block $B_{il}^l$, and $m_i \epsilon M_{il}^l$ a signal transmission and reception which arises the state transition $t_i$. For convenience of description, $-m_i$ represents a signal transmission over a channel going out of the block $B_{il}^l$, $+m_i$ a signal reception over a channel entering into the block $B_{il}^l$, and $0m_i$ a signal transmission and reception over a channel between blocks $B_{il'}^l$ (where $l'<l$) included in the block $B_{il}^l$. For example, the AB protocol of FIG. 1 shows the state transition diagram in the case where each block is a process.

The state transition diagram of a block $B_{il-1}^{l-1}$ of a level $l-1$ is recursively defined on the basis of a finite state machine $D(B_{il-1}^{l-1}) = (S_{il-1}^{l-1}, T_{il-1}^{l-1}, M_{il-1}^{l-1})$ of the block $B_{il}^l$ (where $1 \leq i_l \leq N_l$), as follows: The state $S_{il-1}^{l-1}$ is represented by $G = (S_g, C_g)$ $\epsilon S_{il-1}^{l-1}$, where $S_g = (s_1, \ldots, sN_l)$ and $C_G = (c_{11}, \ldots, c_{NlNl})$. $S_G$ represents the state of the block $B_{il}^l$ (where $1 \leq i_l \leq N_l$) included in the block $B_{il-1}^{l-1}$ and $C_G$ the state of the channel $C_{ij}^l$ between the blocks $B_{il-1}^l$. The state of the channel $C_{ij}^l$ is a signal sequence remaining in the channel.

Let the initial state ($S_0$, $C_0$) be represented by $S_0 = (0_1, \ldots, 0_{Nl})$ and $C_0 = (E, \ldots, E)$. $0_i (1 \leq i \leq N_l)$ represents the initial state of the block $B_{il}^l$ and E represents an empty sequence. (G, G')$\epsilon T_{il-1}^{l-1}$ represents a state transition. Let it be assumed that a necessary and sufficient condition for (G, G) $\epsilon T_{il-1}^{l-1}$ is fulfilled in any one of the following three cases.

(Case 1): The block $B_{il}^l$ transmits a signal to the channel $C_{ij}^l$. (Case 2): The block $B_{il}^l$ receives a signal from the channel $C_{ki}^l$. (Case 3): A signal is transmitted or received over the channel between blocks $B_{il'}^l$, (where $l' < l$) included in the block $B_{il}^l$. When the state G can be reached through zero or more state transitions from the initial state, G is said to be reachable.

In the state transition diagram of the block $B_{il}^l$, if a state transition, which represents the signal transmission $(-m)$ to the block $B_{jl}^l$ (where $j_l \neq i_l$), the signal reception $(+m)$ from the block $B_{jl}^l$, or the signal transmission and reception $(0m)$ between the blocks included in the block $B_{il}^l$, is made at the state $s_i \epsilon S_{il}^l$, then it is stated that m is specified. If $G = (S, C)$ and $S = (s_1, \ldots, s_i, \ldots, s_{Nl})$ are reachable, then it is stated that the transmission $(-m)$ to the block $B_{jl}^l$ or signal transmission or reception $(0m)$ between the blocks included in the block $B_{il}^l$ is executable.

If $G = (S, C)$, $S = (s_1, \ldots, s_i, \ldots, s_{Nl})$ and $C = (c_{11}, \ldots, c_{ji}, \ldots, c_{NlNl})$ are reachable and the signal sequence of $C_{ji}$ is headed by m, then it is stated that the reception $(+m)$ from the block $B_{jl}^l$ is executable.

According to the protocol specification which is synthesized in the present invention, if the state transition diagram of each process to be input is error-free, then it is possible to prevent the occurrence of the following four logical errors.

(1) Unspecified reception

A state transition which represents a reception unspecified in the protocol specification but executable.

(2) Unexecutable transmission and reception

A state transition which represents a transmission or reception specified in the protocol specification but unexecutable.

(3) Deadlock

A reachable state in which state transitions of all processes are not executable and any signals do not remain at all in the channel between the processes.

(4) Infinite overflow

A state at which signals remaining in the channel between processes are infinite.

The state transition diagram $D(B_{il}^j)$ of the block $B_{il}^j$ is divided for the block $B_{jl}^j$ (where $j_f \neq i_l$), as follows:

$$D(B_{il}^j) = D(B_{il}^j, B_1^l) U D(B_{il}^j, B_2^l) U \ldots$$
$$U D(B_{il}^j, B_{(i-1)l}^l)$$
$$U D(B_{il}^j, B_{(i+1)l}^l) U \ldots$$
$$U D(B_{il}^j, B_{Nl}^l),$$

where $D(B_{il}^j; B_{jl}^j) = (S_{(il,jl)}^l, T_{(il,jl)}^l, M_{(il,jl)}^l)$ is constituted as follows:

$$S_{(il,jl)}^l = S_{il}^l \quad (1)$$
$$T_{(il,jl)}^l = T_{il}^l \quad (2)$$
$$M_{(il,jl)}^l = M_{il}^l \quad (3)$$

U: symbol of set operation (Union)     (4)

In the above, if $m \in M_{(il,jl)}^l$ is not a signal transmitted from the block $B_{il}^j$ to the block $B_{jl}^j$ (where $j_f \neq i_l$) or a signal received by the block $B_{il}^j$ from the block $B_{jl}^j$, then it is interpreted as a signal transmitted or received between the blocks in the block $B_{il}^j$. $D(B_{il}^j; B_{jl}^j)$ is called a state transition diagram of the block $B_{il}^j$ for the block $B_{jl}^j$. It is considered that the transition diagram $D(B_{il}^j; B_{jl}^j)$ is obtained by extracting, from the transition diagram $D(B_{il}^j)$, transitions of message transmission and reception between it and the block $B_{jl}^j$ while retaining their sequence.

The problem of synthesization of the protocol R is defined as a problem which, when given a deficient state transition diagram for each process, automatically makes up for the deficiency, thereby synthesizing a complete state transition diagram for each process. In this case, however, it is assumed that the correspondence of incomplete state transition diagrams of the processes is specified in terms of the correspondence of the states of the processes. Yet it must be noted that there is no need of obtaining the correspondence of all states of each process. The state of an incomplete state transition diagram and the state of a state transition diagram which is automatically generated on the basis of the former can automatically be made to correspond to each other.

Figure 3B:
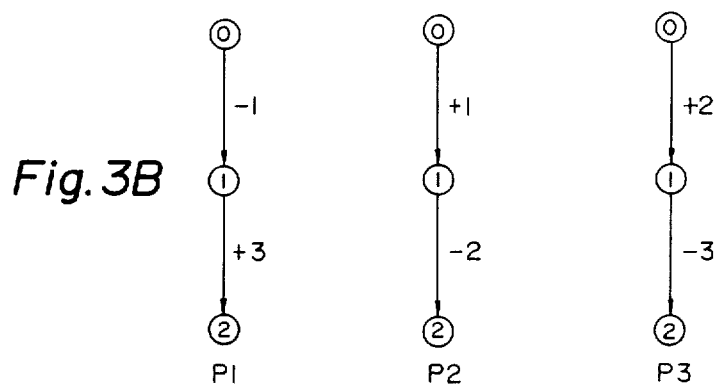
FIG. 3B is a diagram of the synthesization of a completed protocol, for explaining the present invention.
Figure 4:
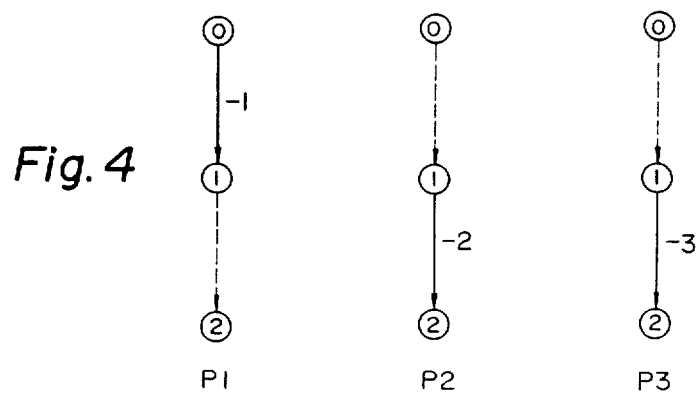
FIG. 4 is a diagram showing an incomplete protocol, for explaining the present invention.

The above is the terms and preconditions which are employed in the present invention. Next, a description will be given of the basic principles of the automatic synthesization of a protocol according to the present invention. FIGS. 3A, 3B and 4 are diagrams explanatory of the automatic synthesization of a three-process protocol according to the present invention; FIG. 3A is a diagram showing predetermined relationships of signal transmission and reception between respective processes, FIG. 3B shows an example of a protocol made complete by synthesization, and FIG. 4 is a diagram showing an incomplete protocol which needs to be automatically synthesized. Accordingly, the following description will be made of how the incomplete protocol of FIG. 4 is rendered into the complete protocol of FIG. 3B. The correspondence between the states of respective processes is represented by a triple of the states of processes P1, P2 and P3. Let it be assumed that, as indicated by solid lines in FIG. 4, a transmission transition −1 of the process P1, a transmission transition 12 of the process P2, and a transmission transition −3 of the process P3 are given as incomplete state transition diagrams of the respective processes. Assume that the states of the processes P1, P2 and P3 correspond in order (0, 0, 0)-(1, 1, 0)-(1, 2, 1)-(2, 2, 2). When these correspondences are specified, reception transitions +1, 2 and +3 are automatically generated simply by the application of the transmission transitions −1, 2, and −3, with the result that the protocol is automatically synthesized. A detailed procedure for the synthesization is as follows: Suppose that the transmission transition −1 from the initial state 0 to the state 1 is given first as an incomplete protocol specification of the process P1. Then, the reception transition +1 from the initial state 0 to the state 1 is automatically synthesized, on the basis of the above, as a state transition diagram combining the processes P2 and P3. At this time, the states 0 and 1 of the process P1 are made to correspond to the states 0 and 1 of the process P2. By dividing this state transition diagram are obtained the reception transition +1 from the initial state 0 to the state 1, as the state transition diagram of the process P2, and the initial state 0, as the state transition diagram of the process P3. At this instant, the states 1 and 2 of the process P2 and the states 0 and 1 of the process P3 are made to correspond to each other.

Next, let it be assumed that the transmission transition −2 from the state 1 to 2 is given as an incomplete protocol specification. By incorporating the transmission transition −2 into the state 1 of the state transition diagram of the process P2, obtained by dividing the above, the reception transition from the initial state 0 to the state 1 and the transmission transition −2 from the state 1 to 2 are obtained as the complete protocol specification of the process P2. Since the state 1 of the process P1 and the state 0 of the process P3 correspond to each other, the reception transition +2 is automatically generated on the basis of the transmission transition −2 embedded in the state 1 of the process 2 and is embedded in the state 0 of the process P3. At this time, the state 1 of the process P1 corresponds to the state 1 of the process P2, the state 1 of the process P2 corresponds to the state 0 of the process P3, and the reception transition +2 has been embedded in the state 0 of the process P3; so that the state 1 of the process P1 is made to correspond to the state 1 of the process P3. Suppose that the transmission transition −3 from the state 1 to the state 2 is given finally as an incomplete protocol specification of the process P3. Then, the reception transition +2 from the initial state 0 to the state 1 and the transmission transition −3 from the state 1 to the state 2 are obtained as the complete protocol specification of the process P3. Furthermore, since the state 1 of the process P1 corresponds to the state 1 of the process P3, the reception transition +3 is automatically synthesized on the basis of the transmission transition −3 and is then embedded in the state 1 of the process P1. Then, the transmission transition −1 from the initial state 0 to the state 1 and the reception transition +3 from the state 1 to the state 2 are obtained as the complete protocol specification of the process P1. Thus, the protocol comprised of the processes P1, P2 and P3 is automatically synthesized, obtaining the complete protocol shown in FIG. 3B. In addition, the correspondence between the states of the respective processes is automatically established. Assuming that $P1=B_1^1$, $P2=B_1^2$ and $P3=B_2^2$, the above-described synthesization procedure follows the a synthesizing dichotomous tree described below.

The hierarchial structure of the protocol R is represented by a directed tree with a root. The level of the directed tree corresponds to the hierarchial level of the protocol. When this directed tree satisfies the following condition, it is called the synthesizing binary tree.

(Condition) each node has two son nodes, at least one of which is a leaf node. Of the two son nodes of the node representing the block $B_1^i$ (where $0 \leq i \leq N-3$), the left node represents $B_1^{i+} = P_{i+1}$ (an $i+1$th process) and the right node $B_2^2$. Of the two son nodes of the node representing $B_2$, the left node represents $B_1^{N-1} = P_{N-1}$ and the right node $B_2^{N-1} = P_N$. $B^0$ represents the protocol R and N the number of all processes involved.

The problem of synthesizing, following the binary tree, a complete protocol specification of each process can be regarded as a problem of synthesizing a complete state transition diagram of the block $B_1^{i+1} = P_{i+1}$ on the basis of a state transition diagram divided from that of the block $B_2^i$ for each block $B_1^{i+1}$, an incomplete state transition diagram $D(B_1^{i+1}; B_2^{i+1})$ of the block $B^{i+1}{}_1$ for the block $B^{i+1}{}_2$, and an incomplete state transition diagram $D(B_2^{i+1}; B_{1i+1})$ of the block $B_1^{i+1}$ for the block $B_1^{i+1}$.

In such a problem, the incomplete state transition diagrams $D(B_1^{i+1}; B_2^{i+1})$ and $D(B_2^{i+1}; B_1^{i+1})$ are both given, but if the correspondence in state between the both can be established, a complete state transition diagram $D(B_2^{i+1}; B_1^{i+1})$ can be created with a complete state transition diagram $D(B_1^{i+1}; B_2^{i+1})$. Therefore, the protocol synthesizing problem can be attributed to such a problem as follows:

In the synthesizing binary tree, when the state transition diagram $D(P_1; B_2^1) = D(P_1)$ for the block $B_2^1$ of the process $P_1$, the state transition diagram $D(P_2; B_2^2)$ for the block $B_2^2$ of the process $P_2$, the state transition diagram $D(P_3; B_2^3)$ for the block $B_2^3$ of the process $P_3$, . . ., the state transition diagram $D(P_{N-2}; B_2^{N-2})$ for the block $B_2^{N-2}$ of the process $P_{N-2}$, and the state transition diagram $D(P_{N-1}; P_N)$ for the block $B_2^{N-1} = P_N$ of the process $P_{N-1}$ are given, complete state transition diagram $D(P_2)$, $D(P_3)$, . . ., and $D(P_N)$ of the processes $P_2, P_3, \ldots$, and $P_N$ are automatically synthesized, whereby the protocol R free from the unspecified reception, unexecutable transmission and reception, deadlock, and infinite overflow is synthesized.

The method of synthesizing the protocol which comprises N ($\geq 2$) processes, proposed by the present invention, follows the synthesizing binary tree and the following three steps are repeatedly executed from $i=1$ to $N-1$.

In the following, $B = P_1U \ldots UP_i$ represents that the block B is composed of processes $P_1, \ldots P_i$.

Step 1: The state transition diagram $D(P_i; B_2^i)$ for the block $B^i{}_2 = P_{i+1}U \ldots UP_N$ of the process $P_i$ (where $1 \leq i \leq N-1$) is given and the state transition diagram $D(P_i; B_2^i)$ is embedded in the state of the state transition diagram $D(P_i; P_1U \ldots UP_{i-1})$, synthesizing a state transition diagram $D(P_i)$.

Step 2: A state transition diagram $D(B_2^i; P_i)$ is automatically synthesized on the basis of the state transition diagram $D(P_i; B_2^i)$ and is embedded in the state of a state transition diagram $D(B_2^i; P_1U \ldots UP_{i-1})$ corresponding to that $D(P_i; P_1U \ldots P_{i-1})$, thereby synthesizing a state transition diagram $D(B_2^i; P_1U \ldots UP_i)$.

Step 3: The state transition diagram $D(B_2^i; P_1U \ldots UP_1)$ is divided into state transition diagrams $D(P_{i+1}; P_1U \ldots UP_i)$ and $D(B_2^i; P_1U \ldots UP_1)$. When $i=1$, however, the step 1 is not needed and it is necessary only to perform the steps 2 and 3. When $i=N-1$, the step 3 is not needed and only steps 1 and 2 are executed.

In the step 1, the state transition diagram $D(P_i; B_2^i)$ which meets five requirements given below in (1) is embedded as defined below in (2).

(1) It is assumed that the state transition diagram for the block $B_2^i$ of the process $P_i$ does not include any logical errors from the beginning. That is, the state transition with no logical errors usually needs the following five requirements.

Figure 5A:
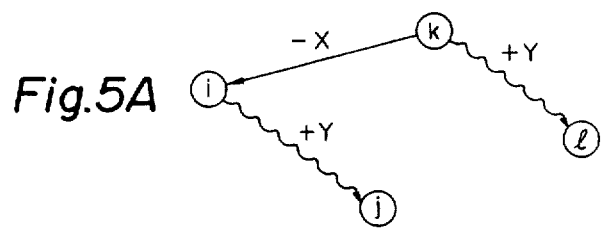
FIGS. 5A, 5B and 5C are diagrams explanatory error-free state transitions, for explaining the present invention.

Requirement 1: As shown in FIG. 5A, when a transmission transition $-x$ from a state k to i exists and a reception transition sequence $+Y$ from the state k to l exists, a reception transition sequence $+Y$ from the state i to a certain state j always exists. In this case, the reception transition sequence $+Y$ is called a propagation reception transition sequence.

Figure 5B:
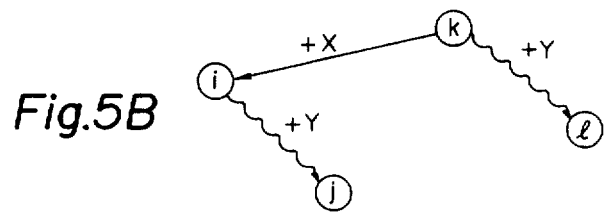

Requirement 2: As shown in FIG. 5B, in the case where reception transition $+x$ from the state k to i and the reception transition sequence $+Y$ from the state k to exist and the channels for x and Y differ, the reception transition sequence $+Y$ from the state i to a certain state j always exists. In this instance, the reception transition sequence $+Y$ from the state i to j is called a propagation reception transition sequence.

Requirement 3: All the states can be reached from the initial state through zero or more state transitions.

Figure 5C:
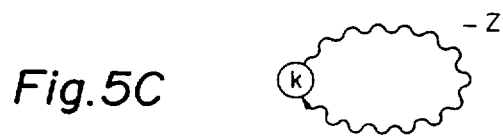

Requirement 4: As shown in FIG. 5C, there is no looping transmission transition sequence $-Z$ from a certain state k to the same state k.

Requirement 5: There is no looping reception transition sequence which does not mean propagation reception transition sequence or the execution of the state transition a finite number of times.

(2) In the present invention, to embed the state transition diagram $D(P_i; B_2^i)$ in the state s of the state transition diagram $D(P_i; P_1U \ldots UP_{i-1})$ is to replace a state s with the state transition diagram $D(P_i; B_2^i)$ in a manner to satisfy the following condition:

(Condition) Now, let a state transition into the state s and a state transition from the state s be represented by t and t′, respectively. At this time, it is stated that t is connected to t′. When the state transition diagram $D(P_i; B_2^i)$ replaced as mentioned above is brought into one state by removing all state transition sequences, t and t′ are connected to each other.

Figure 6A:
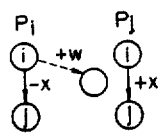
FIGS. 6A to 6R are diagrams showing conversion patterns in arbitrary processes, for explaining the present invention.
Figure 6B:
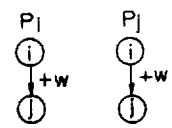
Figure 6C:
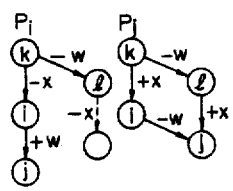
Figure 6D:
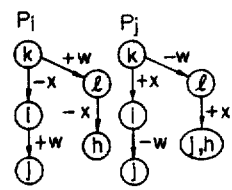
Figure 6E:
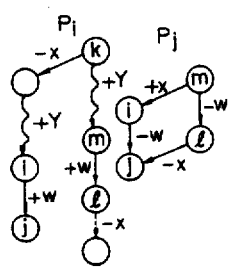
Figure 6F:
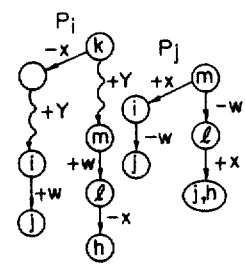
Figure 6G:
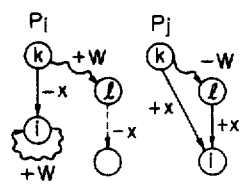
Figure 6H:
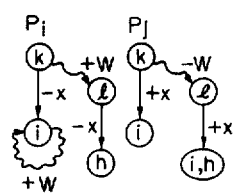
Figure 6I:
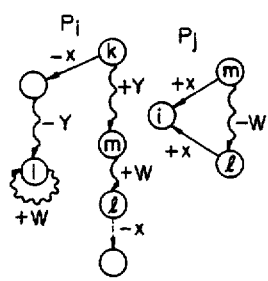
Figure 6J:
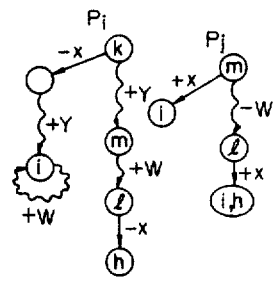
Figure 6K:
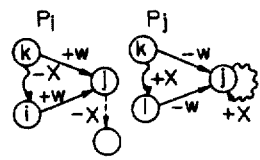
Figure 6L:
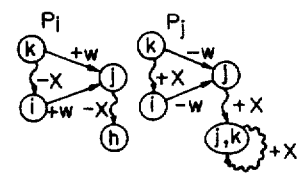
Figure 6M:
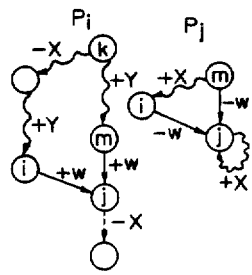
Figure 6N:
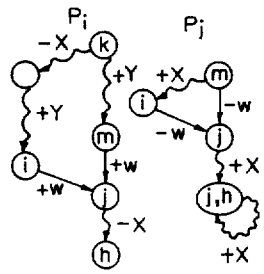
Figure 6O:
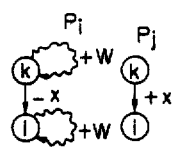
Figure 6P:
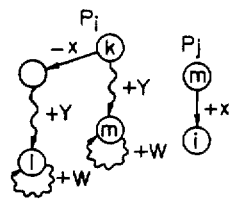
Figure 6Q:
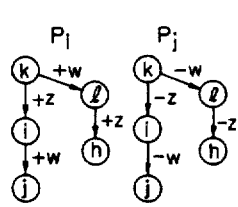
Figure 6R:
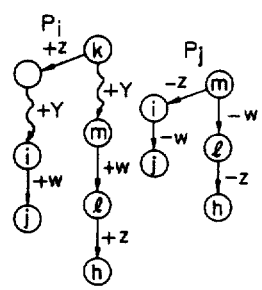

The step 2 is executed as follows:

FIGS. 6A to 6R illustrate typical conversion patterns of the process $P_i$ ($i=1, 2, \ldots N$) and $P_j$ ($j=1, 2, \ldots, N$ but $i \neq j$). The state transition diagram ($P_i; B_2^i$) is resolved into partial state transition diagrams according to the conversion patterns (a) to (r) shown in FIGS. 6A to 6R, respectively, partial state transition diagrams are created corresponding to the resolved ones and are assembled together, thereby automatically generating the state transition diagram $D(B_2^i; P_i)$. Incidentally, the conversion patterns in FIGS. 6A to 6R are intended merely for exemplification, and new conversion patterns can also be produced by combining them.

The state transition diagram $D(P_{i+1}U \ldots UP_N; P_1U \ldots UP_i)$ is divided into $D(P_{i+1}; P_1U \ldots UP_i)$ and $D(P_{i+2}U \ldots UP_N; P_1U \ldots UP_i)$. This follows the division of the state transition diagram.

(Embodiment)

Figure 7:
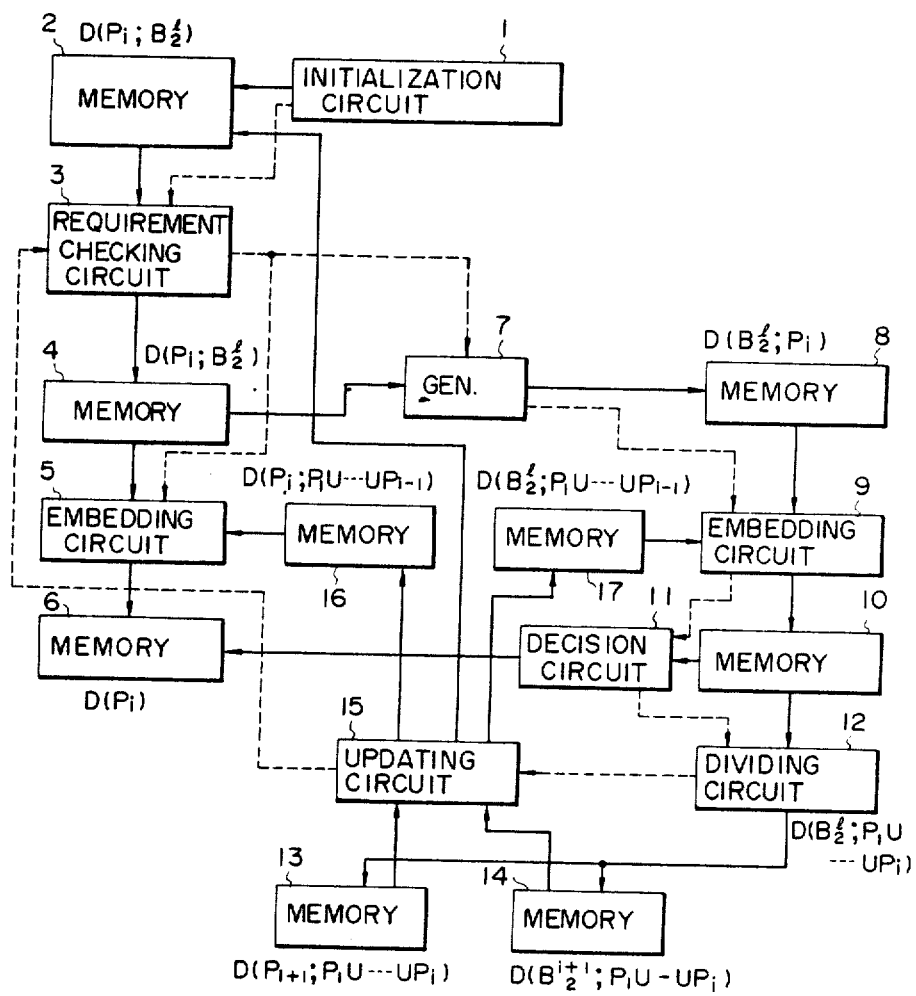
FIG. 7 is a block diagram illustrating an embodiment of the present invention.

FIG. 7 illustrates in block form an automatic protocol synthesizing apparatus embodying the present invention. The following description will be given of a method for automatically synthesizing a protocol by sequentially completing state transition diagrams of respective processes. A description will be given first of respective circuits and memories used in FIG. 7. Reference numeral 1 indicates an initialization circuit for setting initial values of various variables for use in the synthesizing process, 2 a memory for storing an input state transition diagram $D(P_i; B_2^i)$ (where $1 \leq i \leq N-1$), 3 a requirement checking circuit for checking the five requirements, 4 a memory for storing the state transition diagram $D(P_i; B_2^i)$ which satisfies the five requirements, 5 an embedding circuit for embedding the state transition diagram $D(P_i; B_2^i)$ in the state transition diagram $D(P_i; P_1U \ldots UP_{i-1})$, 6 a memory for storing the state transition diagram $D(P_i)$ for output, 7 a generator for generating the state transition diagram $D(B_2^i; P_i)$ on the basis of the state transition diagram $D(P_i; B_2^i)$ in accordance with the conversion patterns (a) through (r), 8 a memory for storing the state transition diagram $D(B_2^i; P_i)$, 9 an embedding circuit for embedding the state transition diagram $D(B_2^i; P_i)$ in that $D(B_2^i; P_1U \ldots P_{i-1})$, 10 a memory for storing the state transition diagram $D(B_2^i; P_1U \ldots UP_i)$, 11 a decision circuit for deciding the end of the synthesization processing, 12 a dividing circuit for dividing the state transition diagram $D(B_2^i; P_1U \ldots UP_i)$ into $D(P_{i+1}; P_1U \ldots UP_i)$ and $D(B_2^{i+1}; P_1U \ldots UP_i)$, 13 a memory for storing the state transition diagram $D(P_{i+1}; P_1U \ldots UP_i)$, 14 a memory for storing the state transition diagram $D(B_2^{i+1}; P_1U \ldots UP_i)$ 15 an updating circuit for updating a variable i by one, 16 a memory for storing the state transition diagram $D(P_i; P_1U \ldots UP_i)$, and 17 a memory for storing the state transition diagram $D(B_2^i; P_1U \ldots UP_{i-1})$. In FIG. 7, the solid lines show the flow of information and the broken lines the flow of control.

TABLE 1

| Process | State | State transition |
|---------|-------|------------------|
| 1 | 0 | $(-d0 \rightarrow P2)1$ |
| 1 | 1 | $(+a0 \leftarrow P2)2$ |
|   |   | $(+a1 \leftarrow P2)4$ |
|   |   | $(+ae \leftarrow P2)4$ |
| . | . | . |
| . | . | . |
| . | . | . |
| 2 | 0 | $(+d0 \leftarrow P1)1$ |
|   |   | $(+d1 \leftarrow P1)3$ |
|   |   | $(+a0 \leftarrow P3)2$ |
|   |   | $(+a1 \leftarrow P3)4$ |
| . | . | . |
| . | . | . |
| . | . | . |
| 3 | 0 | $(+d0 \leftarrow P2)1$ |
| . | . | . |
| . | . | . |
| . | . | . |

Table 1 shows the formation of protocol specifications by storing them, i.e. the state transition diagrams of the respective processes in the memories 2 and 6. For instance, according to Table 1, when the process 1 transmits, at the state 0, the signal d0 to the process 2, a transition to the state 1 occurs, and when the process 1 receives, in the state 1, the signal a0 from the process 2, a transition to the state 2 occurs. The transmission and reception are indicated by "−" and "+", respectively.

Figure 8:
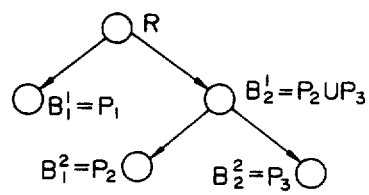
FIG. 8 is a binary tree for synthesizing the AB protocol, for explaining the present invention.
Figure 9A:
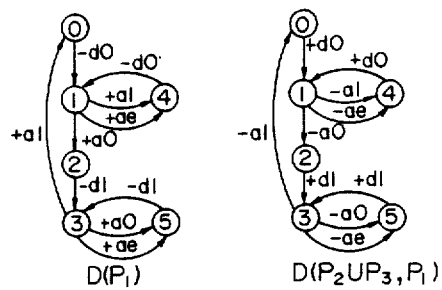
FIGS. 9A, 9B and 9C are diagrams showing the procedure for synthesizing the AB protocol according to the present invention.
Figure 9B:
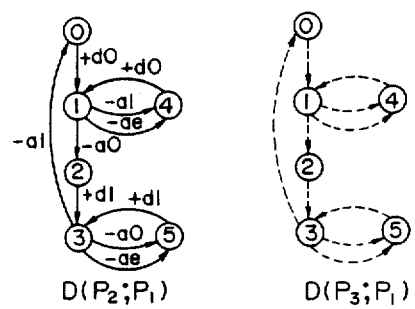
Figure 9C:
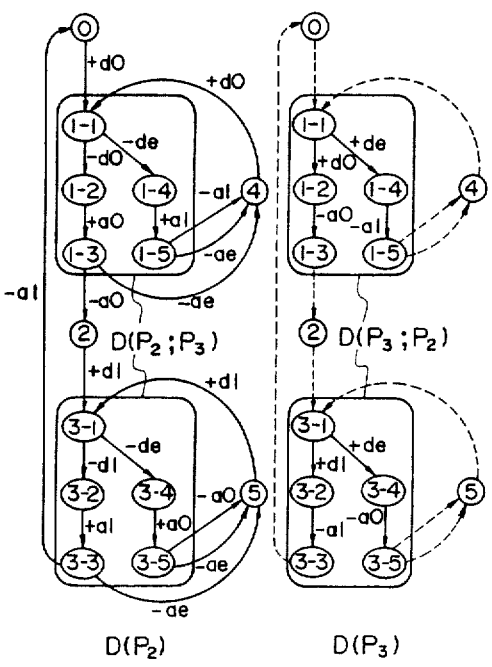

FIG. 8 shows a binary tree for synthesizing the AB protocol. FIGS. 9A to 9C shows the results of synthesization. At first, when the state transition diagram $D(P_1)$ shown in FIG. 9A is given, the state transition diagram $D(P_2UP_3; P_1)$ is created following the conversion patterns (a) through (r) shown in FIGS. 6A to 6R, respectively.

Next, the state transition diagram $D(P_2UP_3; P_1)$ is divided into $D(P_2; P_1)$ and $D(P_3; P_1)$, as depicted in FIG. 9B. Finally, the state transition diagram $D(P_2; P_3)$ is embedded in that $D(P_2; P_1)$, obtaining $D(P_2)$, as shown in FIG. 9C. At the same time, the state transition diagram $D(P_3; P_2)$ derived from that $D(P_2; P_3)$ by the conversion patterns (a) through (r) shown in FIGS. 6A to 6R is embedded in the state transition diagram $D(P_3; P_1)$, obtaining $D(P_3)$. In FIGS. 9A, 9B and 9C, the broken-line state transitions are each a transmission and reception within the same process. The AB protocol obtained in FIGS. 9A, 9B and 9C differs from the protocol shown in FIGS. 1A to 1C, but their executable state transition sequences are exactly the same. Accordingly, the intended AB protocol could be synthesized without any logical errors.

The operation of the embodiment shown in FIG. 7 will hereinafter be described with reference to FIGS. 9A and 9B. Let it be assumed that the state transition diagram $D(P_i; B_2^i)$ (where $1 \leq i \leq N-1$) has already been stored, in the format shown in Table 1, in the memory 2. At first, the initiation circuit 1 operates to make the variable i=1, thereby activating the requirement checking circuit 3. The requirement checking circuit 3 checks whether the state transition diagram $D(P_i; B_2^i)$ satisfies the five requirements or not. If the state transition diagram passes the test, it will be stored in the memory 4. If not, no synthesizing process will be performed. The state transition diagram embedding circuit 5 activated by the requirement checking circuit 3 transfers the state transition diagram $D(P_1; B_2^1) = D(P_1 1)$, as it is, to the memory 6 for storage when i = 1. When i≠1, the state transition diagram $D(P_i)$ obtained by embedding the state transition diagram $D(P_i; B_2^i)$ in the state of the state transition diagram $D(P_i; P_1U \ldots UP_{i-1})$ is transferred to the memory 6 for storage. At the same time, the state transition diagram generating circuit 7 activated by the requirement checking circuit 3 follows the conversion patterns (a) through (r) shown in FIGS. 6A to 6R to create the state transition diagram $D(B_2^i; P_i)$ on the basis of the state transition diagram $D(P_1; B_2^1)$, and transfers the same to the memory 8 for storage. The generating circuit 7 activates the state transition diagram embedding circuit 9. The embedding circuit 9 transfers to the memory 10 the state transition diagram $D(B_2^i; P_1U \ldots UP_i)$ obtained by embedding the state transition diagram $D(B_2^i; P_i)$ in the state of the state transition diagram $D(B_2^i; P_1U \ldots UP_{i-1})$. If i=N−1, the decision circuit 11 for deciding the end of the synthesizing process, activated by the embedding circuit 9, transfers the state transition diagram $D(B_2^{N-1}; P_1U \ldots UP_{N-1}) = D(P_n)$ to the memory 10, completing the synthesizing process. If i≠1, then the state transition diagram dividing circuit 12 is activated. The dividing circuit 12 divides the state transition diagram $D(B_2^i; P_1U \ldots UP_i)$, stored in the memory 10, into $D(P_{i+1}; P_1U \ldots UP_i)$ and $D(B_2^{i+1}; P_1U$ .. UP$_i$), which are transferred to the memories 13 and 14, respectively. The dividing circuit 12 starts the updating circuit 15. The updating circuit 15 increments the variable i by one for updating it, and transfers the stored contents of the memories 13 and 14, as D(P$_i$; P$_1$U ... UP$_{i-1}$) and D(B$_2^i$; P$_1$U ... UP$_{i-1}$), to the memories 16 and 17, respectively. At the same time, the requirement checking circuit 13 is activated again, continuing the synthesization processing. Upon completion of the synthesization processing, the synthesized protocol specification is stored in the memory 6.

It is guaranteed that the protocol synthesized by the present invention is free from the four logical errors mentioned previously.

While the present invention has been described as being applied to the automatic synthesizing system which sequentially completes state transition diagrams of respective processes, the invention is also applicable to an automatic synthesizing system in which incomplete state transition diagrams of the respective processes are completed altogether at the last stage. Furthermore, the present invention is not limited specifically to the AB protocol but may be applied to No. 7 TUP (Telephone User Part) protocol, ISDN (Integrated Services Digital Network) protocol, etc. as well.

As described above in detail, the system of the present invention is advantageous over the prior art systems in that (1) no limitations are imposed on the number of processes of the protocol to be automatically synthesized and a process containing a looping reception sequence can also be used, and in that (2) if an incomplete protocol specification has no logical errors, its deficiency is automatically made up for, enabling an error-free, complete protocol specification to be automatically synthesized with high efficiency. Hence the present invention is of great utility.

What we claim is:

1. An automatic protocol synthesizing system for receiving as inputs incomplete state transition diagrams of at least two functionally incomplete processes forming a protocol and for outputting completed state transition diagrams of the processes, comprising: checking means for making a check for a logical error of the incomplete state transition diagram; embedding means activated by the checking means for embedding the state transition diagram of a process corresponding to the incomplete state transition diagram of an ith (where $1 \leq i \leq$ ) one of the processes in the ith incomplete state transition diagram; state transition diagram generating means activated by the checking means for automatically generating a state transition diagram including all of the remaining (i+1)th and subsequent processes, on the basis of the embedded state transition diagram; and dividing means coactive with said generating means for dividing the thus automatically synthesized state transition diagram into the state transition diagram of the (i+1)th one of all the automatically generated processes and the state transition diagram for the other processes; wherein the operations of the checking means, the embedding means, the state transition diagram generating means and the dividing means are repeated by (N−1) times to complete the state transition diagram for each process, thereby making the protocol functionally complete.

2. An automatic protocol synthesizing system for receiving as inputs incomplete state transition systems of at least two functionally incomplete processes forming a protocol and for outputting completed state transition diagrams of the processes according to claim 1, including a decision circuit coactive with said embedding means for deciding the end of the synthesization processing.

* * * * *